(12) United States Patent
Han et al.

(10) Patent No.: US 11,925,291 B2
(45) Date of Patent: *Mar. 12, 2024

(54) POT LID ASSEMBLY AND COOKING UTENSIL

(71) Applicant: Instant Brands Holdings Inc., Downers Grove, IL (US)

(72) Inventors: Yude Han, Zhejiang (CN); Yi Qin, Ottawa (CA); Jiwei Wang, Ottawa (CA)

(73) Assignee: Instant Brands Holdings Inc., Downers Grove, IL (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/335,872

(22) Filed: Jun. 1, 2021

(65) Prior Publication Data

US 2021/0378442 A1 Dec. 9, 2021

(30) Foreign Application Priority Data

Jun. 9, 2020 (CN) .......................... 202021049427.8

(51) Int. Cl.
*A47J 36/16* (2006.01)
*A47J 27/08* (2006.01)
(Continued)

(52) U.S. Cl.
CPC ............. *A47J 36/165* (2013.01); *A47J 27/08* (2013.01); *A47J 43/044* (2013.01); *A47J 43/0711* (2013.01); *A47J 2043/0449* (2013.01)

(58) Field of Classification Search
None
See application file for complete search history.

(56) References Cited

U.S. PATENT DOCUMENTS

| 4,065,811 A | 12/1977 | Pauty |
| 4,339,992 A | 7/1982 | Kurland |

(Continued)

FOREIGN PATENT DOCUMENTS

| CN | 1080158 A | 1/1994 |
| CN | 1160339 A | 9/1997 |

(Continued)

OTHER PUBLICATIONS

CN 207590476 U (Ding, Zhi-Hui et al.) Jul. 10, 2018 [retrieved Oct. 21, 2023]. Retrieved from Foreign Image and Text Database, translated by Clarivate Analytics. (Year: 2018).*

(Continued)

*Primary Examiner* — John J Norton
(74) *Attorney, Agent, or Firm* — Crowell & Moring LLP

(57) ABSTRACT

A pot lid assembly configured to cover a pot body. The pot lid assembly comprises a pot lid and a mixing machine. The mixing machine includes an electric motor and a mixing apparatus. The mixing apparatus includes a stirring rod and a plurality of stirring vanes positioned on the stirring rod. The electric motor includes a rotary shaft operatively connected with the stirring rod so that the electric motor can cause the stirring rod to rotate. The pot lid is configured to cover the pot body to form a closed cooking space. When the pot lid is removed from the pot body, the mixing apparatus remains located in the cooking space of the pot body. When the pot lid assembly of the present application is in use, the mixing apparatus remains in the cooking space of the pot body after the removal of the pot lid.

17 Claims, 9 Drawing Sheets

(51) Int. Cl.
    *A47J 43/044*     (2006.01)
    *A47J 43/07*     (2006.01)

(56) References Cited

U.S. PATENT DOCUMENTS

| | | | |
|---|---|---|---|
| 5,013,158 A * | 5/1991 | Tarlow | B01F 35/3204 |
| | | | 99/348 |
| 5,372,422 A | 12/1994 | Dubroy | |
| 5,533,801 A | 7/1996 | Safont et al. | |
| 5,547,279 A | 8/1996 | Spitzer, Sr. | |
| 5,816,136 A | 10/1998 | Stallings | |
| 5,938,325 A | 8/1999 | Edwards | |
| 6,629,491 B1 | 10/2003 | Chan | |
| 9,138,103 B1 | 9/2015 | Cados | |
| 9,687,103 B2 | 6/2017 | Conti et al. | |
| 9,693,649 B2 | 7/2017 | Conti et al. | |
| 10,427,116 B2 | 10/2019 | Altenritter et al. | |
| 2003/0193835 A1 | 10/2003 | Richardson | |
| 2008/0223810 A1 | 9/2008 | Garcia | |
| 2008/0257168 A1 | 10/2008 | Wolfe | |
| 2012/0189745 A1 | 7/2012 | DeLong | |
| 2021/0378449 A1 * | 12/2021 | Han | A47J 43/0711 |

FOREIGN PATENT DOCUMENTS

| | | |
|---|---|---|
| CN | 1751635 A | 3/2006 |
| CN | 201316179 Y | 9/2009 |
| CN | 201551179 U | 8/2010 |
| CN | 201861482 U | 6/2011 |
| CN | 102151094 A | 8/2011 |
| CN | 201968506 U | 9/2011 |
| CN | 202397249 U | 8/2012 |
| CN | 202426351 U | 9/2012 |
| CN | 103006086 A | 4/2013 |
| CN | 102151068 B | 5/2013 |
| CN | 103222810 A | 7/2013 |
| CN | 102551504 B | 7/2014 |
| CN | 204133150 U | 2/2015 |
| CN | 204232841 U | 4/2015 |
| CN | 204232842 U | 4/2015 |
| CN | 204232843 U | 4/2015 |
| CN | 204232943 U | 4/2015 |
| CN | 204318383 U | 5/2015 |
| CN | 204336688 U | 5/2015 |
| CN | 204378845 U | 6/2015 |
| CN | 204378846 U | 6/2015 |
| CN | 204580867 U | 8/2015 |
| CN | 204580980 U | 8/2015 |
| CN | 204813466 U | 12/2015 |
| CN | 105581630 A | 5/2016 |
| CN | 105640297 A | 6/2016 |
| CN | 105662119 A | 6/2016 |
| CN | 105686620 A | 6/2016 |
| CN | 205338585 U | 6/2016 |
| CN | 102334908 B | 9/2016 |
| CN | 105935261 A | 9/2016 |
| CN | 103648344 B | 11/2016 |
| CN | 106731999 A | 5/2017 |
| CN | 206137870 U | 5/2017 |
| CN | 206137942 U | 5/2017 |
| CN | 206182997 U | 5/2017 |
| CN | 206197735 U | 5/2017 |
| CN | 206197736 U | 5/2017 |
| CN | 206197737 U | 5/2017 |
| CN | 106901587 A | 6/2017 |
| CN | 206213124 U | 6/2017 |
| CN | 206239177 U | 6/2017 |
| CN | 107242769 A | 10/2017 |
| CN | 107242803 A | 10/2017 |
| CN | 206560359 U | 10/2017 |
| CN | 206586800 U | 10/2017 |
| CN | 107361621 A | 11/2017 |
| CN | 107361622 A | 11/2017 |
| CN | 107361623 A | 11/2017 |
| CN | 206641761 U | 11/2017 |
| CN | 105581631 B | 12/2017 |
| CN | 103767570 B | 1/2018 |
| CN | 107616676 A | 1/2018 |
| CN | 107773019 A | 3/2018 |
| CN | 207071018 U | 3/2018 |
| CN | 207125647 U | 3/2018 |
| CN | 207323275 U | 5/2018 |
| CN | 207492549 U | 6/2018 |
| CN | 207492550 U | 6/2018 |
| CN | 207492551 U | 6/2018 |
| CN | 207492552 U | 6/2018 |
| CN | 207492553 U | 6/2018 |
| CN | 105640295 B | 7/2018 |
| CN | 207590472 U | 7/2018 |
| CN | 207590473 U | 7/2018 |
| CN | 207590475 U | 7/2018 |
| CN | 207590476 U | 7/2018 |
| CN | 207590477 U | 7/2018 |
| CN | 207590478 U | 7/2018 |
| CN | 207590528 U | 7/2018 |
| CN | 207627014 U | 7/2018 |
| CN | 207755173 U | 8/2018 |
| CN | 207768204 U | 8/2018 |
| CN | 105640294 B | 9/2018 |
| CN | 108606622 A | 10/2018 |
| CN | 108618574 A | 10/2018 |
| CN | 108670015 A | 10/2018 |
| CN | 208114512 U | 11/2018 |
| CN | 208274488 U | 12/2018 |
| CN | 208286832 U | 12/2018 |
| CN | 208286837 U | 12/2018 |
| CN | 208286838 U | 12/2018 |
| CN | 208286839 U | 12/2018 |
| CN | 208286840 U | 12/2018 |
| CN | 208286882 U | 12/2018 |
| CN | 208286891 U | 12/2018 |
| CN | 105640296 B | 1/2019 |
| CN | 109247803 A | 1/2019 |
| CN | 109247840 A | 1/2019 |
| CN | 109247842 A | 1/2019 |
| CN | 208301462 U | 1/2019 |
| CN | 208371517 U | 1/2019 |
| CN | 208435231 U | 1/2019 |
| CN | 208435327 U | 1/2019 |
| CN | 208435342 U | 1/2019 |
| CN | 208463593 U | 2/2019 |
| CN | 109419368 A | 3/2019 |
| CN | 208551083 U | 3/2019 |
| CN | 208551371 U | 3/2019 |
| CN | 208582197 U | 3/2019 |
| CN | 208590899 U | 3/2019 |
| CN | 208640356 U | 3/2019 |
| CN | 208692904 U | 4/2019 |
| CN | 208692940 U | 4/2019 |
| CN | 208692941 U | 4/2019 |
| CN | 208692942 U | 4/2019 |
| CN | 208692943 U | 4/2019 |
| CN | 208693024 U | 4/2019 |
| CN | 208693025 U | 4/2019 |
| CN | 208693027 U | 4/2019 |
| CN | 208709336 U | 4/2019 |
| CN | 208709337 U | 4/2019 |
| CN | 208709338 U | 4/2019 |
| CN | 208709339 U | 4/2019 |
| CN | 208709538 U | 4/2019 |
| CN | 208709539 U | 4/2019 |
| CN | 208725475 U | 4/2019 |
| CN | 208725515 U | 4/2019 |
| CN | 208740650 U | 4/2019 |
| CN | 208808128 U | 5/2019 |
| CN | 209031893 U | 6/2019 |
| CN | 209047874 U | 7/2019 |
| CN | 209047929 U | 7/2019 |
| CN | 209060967 U | 7/2019 |
| CN | 209074131 U | 7/2019 |
| CN | 209074132 U | 7/2019 |
| CN | 209074241 U | 7/2019 |
| CN | 209106931 U | 7/2019 |
| CN | 209106932 U | 7/2019 |

(56) References Cited

FOREIGN PATENT DOCUMENTS

| | | |
|---|---|---|
| CN | 209121878 U | 7/2019 |
| CN | 110115495 A | 8/2019 |
| CN | 110115509 A | 8/2019 |
| CN | 209202774 U | 8/2019 |
| CN | 106963229 B | 9/2019 |
| CN | 209377296 U | 9/2019 |
| CN | 209377297 U | 9/2019 |
| CN | 209377303 U | 9/2019 |
| CN | 209391661 U | 9/2019 |
| CN | 209436890 U | 9/2019 |
| CN | 209436893 U | 9/2019 |
| CN | 110353472 A | 10/2019 |
| CN | 209474414 U | 10/2019 |
| CN | 209678165 U | 11/2019 |
| CN | 106388619 B | 12/2019 |
| CN | 210018910 U | 2/2020 |
| CN | 210095498 U | 2/2020 |
| CN | 110870678 A | 3/2020 |
| DE | 861913 C | 1/1953 |
| EP | 2903486 B1 | 6/2019 |
| KR | 100503442 B1 | 7/2005 |
| KR | 2015-0052545 A | 5/2015 |
| KR | 2019-0130253 A | 11/2019 |
| KR | 2020-0022895 A | 3/2020 |
| WO | WO 2020/022640 A1 | 1/2020 |
| WO | WO 2020/099693 A1 | 5/2020 |

OTHER PUBLICATIONS

U.S. Appl. No. 17/335,965, filed Jun. 1, 2021, Han et al.
U.S. Appl. No. 17/335,978, filed Jun. 1, 2021, Han et al.
Extended European Search Report for Application No. EP 21178276.8 dated Oct. 27, 2021, 9 pages.
Extended European Search Report for Application No. EP 21178231.3 dated Oct. 14, 2021, 8 pages.
Extended European Search Report for Application No. EP 21178246.1 dated Oct. 15, 2021, 10 pages.

* cited by examiner

POT LID ASSEMBLY AND COOKING UTENSIL

RELATED APPLICATION

The present application claims priority to Chinese Patent Application Number CN2020210494278, filed Jun. 9, 2020, the entirety of which is hereby incorporated by reference.

FIELD

The present disclosure relates to the field of small household electrical appliances and, more particularly, to a pot lid assembly and cooking utensil.

BACKGROUND

Automatic frying machines are smart cooking appliances that achieve automatic cooking. In comparison with the conventional cooking pot, automatic frying machines have the functions of automatic oil heating, automatic frying and automatic heat control, and are widely popular. An automatic frying machine includes a pot body and a pot lid assembly. The pot lid assembly includes a pot lid, an electric motor fitted to the pot lid, and a stirrer assembly connected to the electric motor. The electric motor causes the stirrer assembly to rotate in order to fry the food ingredients in the pot body. When partway through the cooking process, and addition of ingredients is required, it is necessary to open the pot lid assembly, at which time the stirrer assembly is removed from the pot body together with the pot lid assembly. However, when the pot lid assembly is refitted, the stirrer assembly will press down on the food ingredients in the pot body, which is not conducive to the refitting of the pot lid assembly, and is otherwise inconvenient.

SUMMARY OF THE DESCRIPTION

The present application provides a pot lid assembly and cooking utensil that is convenient to use.

The present disclosure aims to provide a pot lid assembly configured to cover a pot body. The pot lid assembly comprises a pot lid and a mixing machine. The mixing machines includes an electric motor and a mixing apparatus. The mixing apparatus includes a stirring rod and a plurality of stirring vanes positioned on the stirring rod. The electric motor includes a rotary shaft operatively connected with the stirring rod so that the electric motor can cause the stirring rod to rotate. The pot lid is configured to cover the pot body to form a closed cooking space. When the pot lid is removed from the pot body, the mixing apparatus remains located in the cooking space of the pot body.

Further, the pot lid is provided with a passageway. The stirring rod and the rotary shaft are fixedly connected. A portion of the mixing machine is located in the passageway. When the pot lid moves upwards to be disengaged from the pot body, a portion of the mixing machine exits from the passageway. The rotary shaft of the electric motor is connected to the stirring rod of the mixing apparatus. When the pot lid moves downwards to cover the pot body, a portion of the mixing machine passes through the passageway.

Further, the pot lid assembly includes a sealing piece sheathed on the mixing machine to prevent air leakage from the passageway.

Further, the mixing machine includes a positioning piece and an electric motor assembly fitted to the positioning piece. The electric motor assembly includes a housing. The electric motor is positioned within the housing, and the housing is detachably fitted to the positioning piece.

Further, the housing includes a first holding section. The positioning piece includes a housing, a pusher, and an elastic piece fitted to the housing. The pusher is provided with a second holding section. One end of the elastic piece is abutted against the housing, and the other end of the elastic piece is abutted against the pusher. The first holding section and the second holding section are engaged such that the electric motor assembly is positioned on the positioning piece, and the first holding section and the second holding section can be disengaged by pushing the pusher.

Further, the housing includes a pair of arms, and the arms are configured to clamp to the pot body.

Further, the end of each of the arms is provided with a concaved slot into which a portion of the pot body is received.

Further, the electric motor is fixed to the pot lid. The stirring rod and the rotary shaft are detachably connected. When the pot lid is removed from the pot body, the rotary shaft of the electric motor is disengaged from the stirring rod, and the mixing apparatus remains standing in the cooking space of the pot body. The mixing apparatus also includes a plurality of stirring vanes. The bottoms of the plurality of stirring vanes are coplanar, so that the mixing apparatus can stand in the cooking space of the pot body with the stirring vanes serving as a support. The stirring rod is provided with a magnet disposed at the bottom thereof. The magnet and the pot body are magnetically attracted to each other so that the mixing apparatus can stand in the cooking space of the pot body.

Further, the pot lid includes a top plate section, handles, a fastening piece positioned on the top plate section, and an abutment piece positioned on the fastening piece. The fastening piece wraps around the edges of the top plate section. The abutment piece is configured to clamp to the pot body.

The present application further provides a cooking utensil comprising a pot body and the pot lid assembly as defined above.

When the pot lid assembly of the present application is in use, the mixing apparatus remains in the cooking space of the pot body after the removal of the pot lid. Compared to the problem associated with uneasy reassembly of the pot lid due to the presence of food ingredients after the removal of the mixing apparatus together with the pot lid, the pot lid assembly of the present application enables convenient reassembly of the pot lid.

DETAILED DESCRIPTION

Here the exemplary embodiments will be described in detail with reference to the accompanying drawings. Unless otherwise stated in the description of the accompanying drawings, it is to be noted that same numerals represent the same or similar elements. The exemplary embodiments described below do not represent all embodiments consistent with the present application. On the contrary, they are merely examples of devices consistent with some aspects of the present application described in detail in the appended claims.

The terms used in the present application are merely intended to describe specific embodiments instead of limiting the present application. Unless otherwise defined, the technical or scientific terms used in the present application shall have ordinary meanings commonly understood by persons of ordinary skills in the art. The terms "first", "second" and the like used in the description and claims of the present application do NOT indicate any sequence, quantity or importance, but are intended to identify different constituent parts. Similarly, words such as "one" or "a" also do NOT indicate quantity limits, but indicates the presence of at least one. "A plurality of" or "several" indicate two or more. Unless otherwise indicated, the terms "front section", "rear section", "lower section" and/or "upper section" and the like are merely intended for facilitating illustration, instead of limiting to a location or spatial orientation. The terms "comprises" or "includes" and the like are intended to refer to the components or items appearing before the words "comprises" or "includes", including the components or items appearing after the words "comprises" or "includes" and their equivalence, and do NOT exclude other components or items. The terms "connect" or "link" and the like are not limited to physical or mechanical connections, and may include electrical connections, be they direct or indirect. Unless otherwise clearly defined by context, the singular forms "a", "the" and "that" used in the description and claims of the present application are intended to include the plurals. It must also be understood that the words "and/or" used herein refer to and include any and all possible combinations of one or a plural number of associated listed items.

Figure 1:
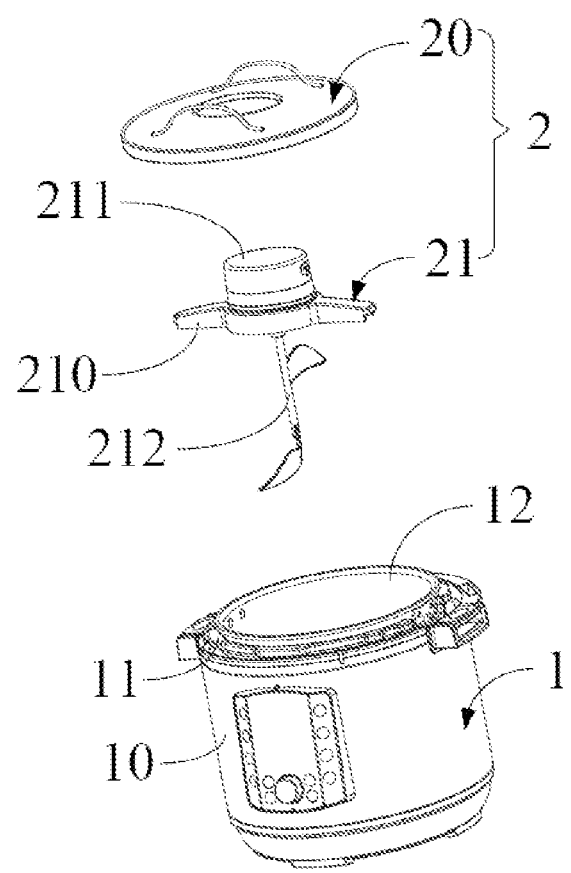
FIG. 1 is an exploded isometric view of a first embodiment of a cooking utensil of the present application, wherein the pot lid assembly is not fitted to the pot body.

As shown in FIG. 1, an electric pressure cooker of the present application comprises a pot body 1 and a pot lid assembly 2. The pot body 1 includes a cooking space, a bottom slab 1201 and a side wall 120 enclosing the cooking space, a curved section 121 extended from the side wall 120, and an edge section 122 extended from the curved section 121. Food ingredients are placed in the cooking space for cooking. The pot lid assembly 2 comprises a pot lid 20 and a mixing apparatus 21.

In an embodiment, the pot body 1 includes a plastic housing 10, a thermal insulation casing 11 located in the plastic housing 10, and an inner pot 12 placed in the thermal insulation casing 11. The inner pot 12 can be taken out from the thermal insulation casing 11 for cleaning. The thermal insulation casing 11 is made of metal. The inner pot 12 is configured to contain food. The inner pot 12 includes a bottom slab 1201, a side wall 120, a curved section 121 and an edge section 122. In some embodiments, the inner pot 12 and the plastic housing 10 are integrated into one and not detachable.

Figure 2:
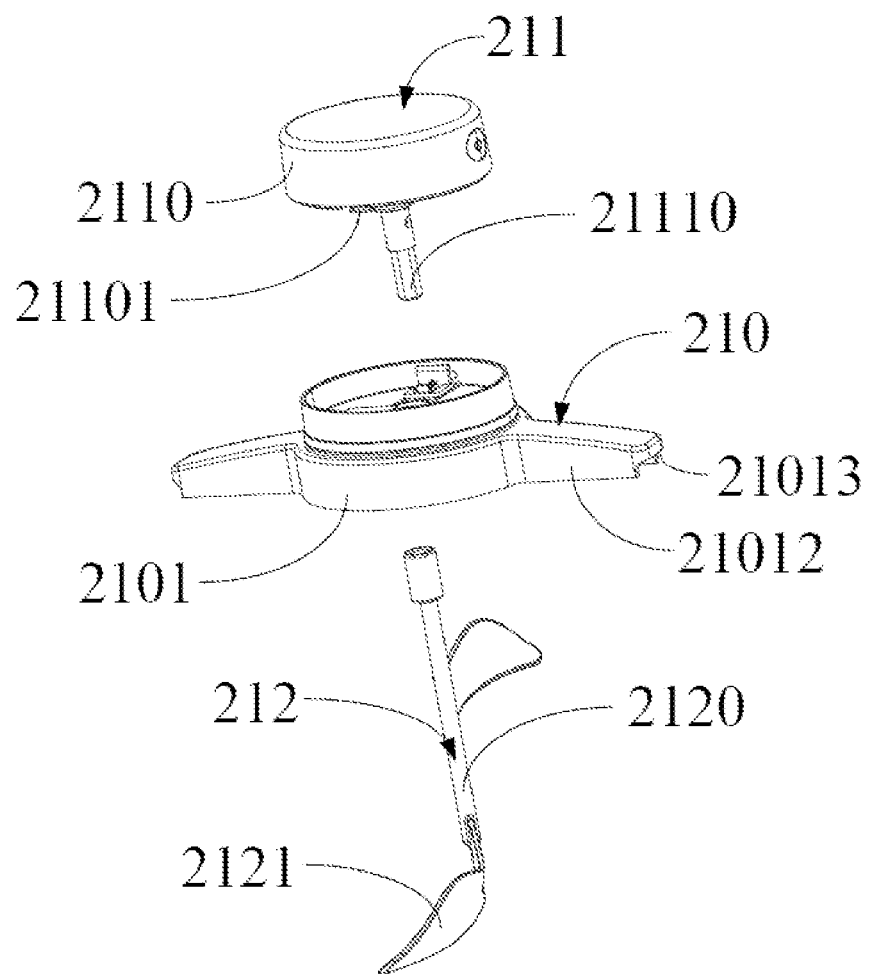
FIG. 2 is an exploded view of the mixing machine shown in FIG. 1.
Figure 3:
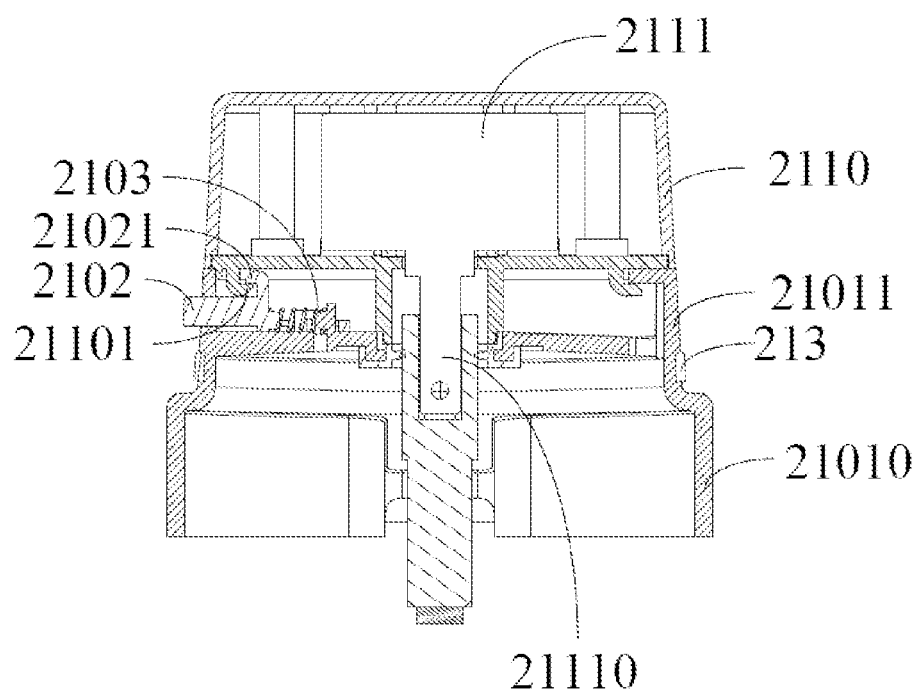
FIG. 3 is a schematic sectional view of the mixing machine shown in FIG. 2, wherein the mixing apparatus is not shown.
Figure 4:
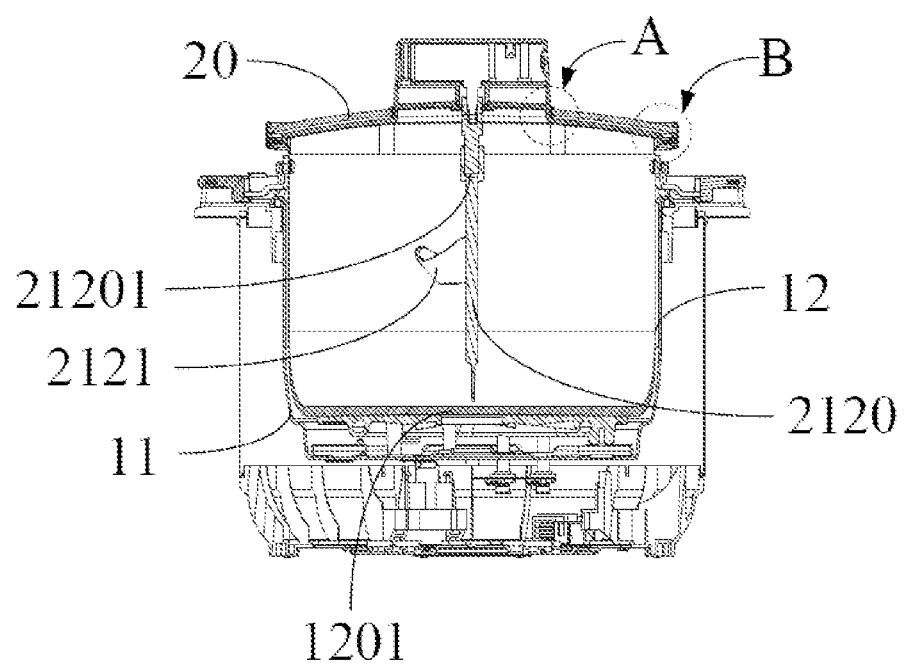
FIG. 4 is a schematic sectional view of the cooking utensil shown in FIG. 1.

As shown in FIGS. 2 and 4, the mixing machine 21 includes a positioning piece 210, an electric motor assembly 211 fitted to the positioning piece 210, and a mixing apparatus 212 fitted to the electric motor assembly 211. The electric motor assembly 211 includes a housing 2110 and an electric motor 2111 positioned within the housing 2110. The housing 2110 includes a first holding section 21101. The electric motor 2111 includes a rotary shaft 21110 extended from the housing 2110.

The positioning piece 210 includes a housing 2101, a pusher 2102, and an elastic piece 2103 fitted to the housing 2101. The housing 2101 includes a base section 21010, a positioning section 21011 extended upwardly from the base section 21010, and a pair of arms 21012 extended outwardly from the section 21010. The base section 21010 has a diameter greater than the diameter of the positioning section 21011. The mixing machine 21 includes a sealing piece 213 sheathed on the positioning section 21011. The pusher 2102 is provided with a second holding section 21021. One end of the elastic piece 2103 is abutted against the housing 2101, and the other end of the elastic piece 2103 is abutted against the pusher 2102.

Figure 7:
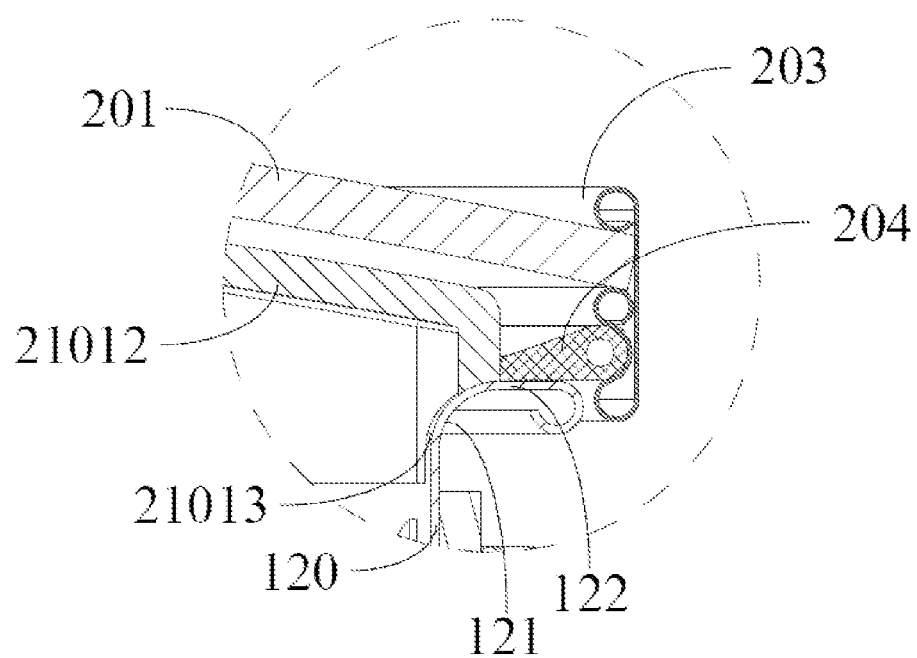
FIG. 7 is an enlarged view at B of the schematic sectional view shown in FIG. 4.

The end of each of the arms 21012 is provided with a concaved slot 21013. As shown in FIG. 7, the slot 21013 and the curved section 121 of the pot body 1 are shape-adapted. When the electric motor assembly 211 is placed in the pot body 1, the curved section 121 of the pot body 1 is located in the slot 21013 so that the stability of the electric motor assembly 211 is increased after its being placed in the pot body 1.

When the electric motor assembly 211 is fitted to the positioning piece 210, the first holding section 21101 and the second holding section 21021 are engaged, and the elastic force of the elastic piece 2103 acts against the pusher 2102 and causes the first holding section 21101 and the second holding section 21021 to be effectively engaged. When the electric motor assembly 211 needs to be removed, the pusher 2102 is pushed, causing the second holding section 21021 to move in a direction away from the first holding section 21101 so that the second holding section 21021 is disengaged from the first holding section 21101 for the electric motor assembly 211 to be removed. This design effectively ensures the fastening effects on the electric motor assembly 211 and the positioning piece 210, and facilitates fixation of the electric motor assembly 211 to the positioning piece 210.

The mixing apparatus 212 includes a stirring rod 2120 and a plurality of stirring vanes 2121 positioned on the stirring rod 2120. The stirring rod 2120 is fitted to the rotary shaft 21110 of the electric motor 2111 such that the electric motor 2111 in operation causes rotation of the rotary shaft 21110 which in turn causes the stirring vanes 2121 to rotate for mixing food ingredients. The inner pot wall 120 is provided with a bottom slab 1201 located beneath the stirring rod 2120.

In the embodiment shown, the stirring rod 2120 is provided with a reception slot 21201 disposed at the top thereof. The end section of the rotary shaft 21110 is received in the reception slot 21201. The reception slot 21201 is adapted to the end section of the rotary shaft 21110 such that rotation of the rotary shaft 21110 can cause the stirring rod 2120 to rotate. The reception slot 21201 may also be arranged on the rotary shaft 21110, with the top of the stirring rod 2120 received in the reception slot 21201. The reception slot 21201 and the rotary shaft 21110 may be shape-adapted. For example, the reception slot 21201 and the rotary shaft 21110 are not circular, but generally square, triangular, semicircular or hexagonal. The reception slot 21201 and the rotary shaft 21110 may also be fixed using fasteners such as dowel pins or a combination of moveable stop balls and positioning slot. The reception slot 21201 and the rotary shaft 21110 may also be fixed by a tight fit.

Figure 5:
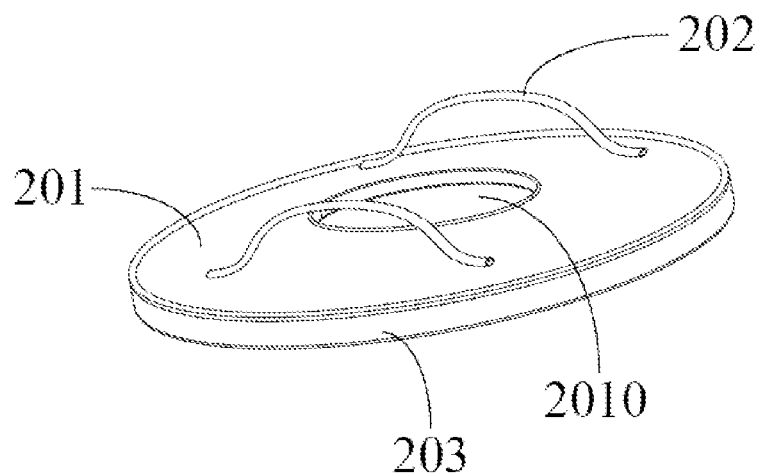
FIG. 5 is an isometric view of the pot lid assembly shown in FIG. 1.
Figure 6:
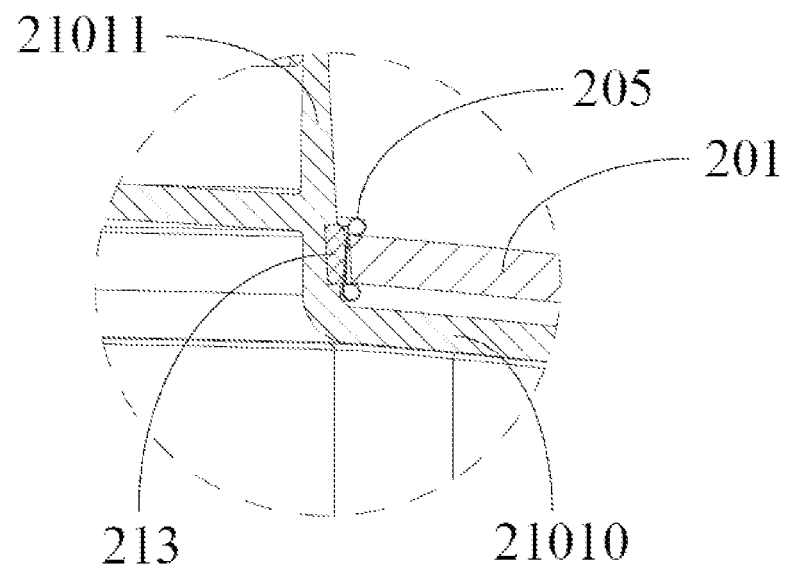
FIG. 6 is an enlarged view at A of the schematic sectional view shown in FIG. 4.

As shown in FIGS. 5~7, the pot lid 20 is configured to cover the pot body 1 so that a closed cooking space is formed by the pot body 1 and the pot lid 20. The pot lid 20 includes a top plate section 201, handles 202 positioned on the top plate section 201, a fastening piece 203, and an abutment piece 204 positioned on the fastening piece 203. The top plate section 201 is made of glass that allows the cooking in the pot body 1 to be observed. The fastening piece 203 is made of metal, circular in shape, and wraps around the edges of the top plate section 201. The top plate section 201 includes a passageway 2010. The protective piece 205 is made of metal, circular and partially located in the passageway 2010. The protective piece 205 has a smooth finish that prevents the top plate section 201 from scratching the sealing piece 213.

The pot lid 20 moves upwards when being removed, and a portion of the electric motor assembly 211 passes through the passageway 2010 during the removal of the pot lid 20, at which time the mixing machine 21 still remains in the cooking space of the pot body 1. During its reassembly, the pot lid 20 moves downwards to clamp to the pot body 1 and a portion of the electric motor assembly 211 passes through the passageway 2010. The sealing piece 213 and the protective piece 205 are tightly fitted to prevent air leakage from the passageway 2010. It may be chosen that no protective piece 205 be provided to the pot lid 20, in which case the sealing piece 213 and the top plate section 201 need to be tightly fitted.

Once the pot lid assembly 2 is fitted to the pot body 1, the stirring vanes 2121 of the mixing apparatus 212 are located in the cooking space of the pot body 1 to mix food ingredients. The pot lid 20 is located above the arms 21012, a portion of the electric motor assembly 211 passes through the passageway 2010, and the abutment piece 204 is clamped to the edge section 122 of the pot body 1 so that the pot lid 20 is supported on the pot body 1. When partway through the cooking process, and addition of ingredients is needed, and the pot lid 20 is removed. Since there is no fastening force between the pot lid 20 and the mixing machine 21, the mixing machine 21 does not get taken out and the mixing apparatus 212 remains in the cooking space of the pot body after the removal of the pot lid 20. After addition of ingredients is completed, the pot lid 20 is made to cover the pot body. Compared to the problem associated with uneasy reassembly of the pot lid 20 due to the presence of food ingredients after the removal of the mixing apparatus 212 together with the pot lid 20, the cooking utensil of the present application enables convenient reassembly of the pot lid 20. Furthermore, the retention of the mixing apparatus 212 in the cooking space of the pot body 1 prevents the problem of uneven frying due to some food ingredients being pressed under the stirring rod 2120 when the mixing apparatus 212 is placed into the cooking space of the pot body 1 again, thereby ensuring desirable taste of the processed food.

When the cooking utensil of the present application is in use, the mixing apparatus 212 is first placed in the pot body 1 before food ingredients, after which the pot lid 20 is fitted. This effectively prevents the problem of uneven frying due to some food ingredients being located under the stirring rod 2120, thereby ensuring desirable taste of the processed food.

Figure 8:
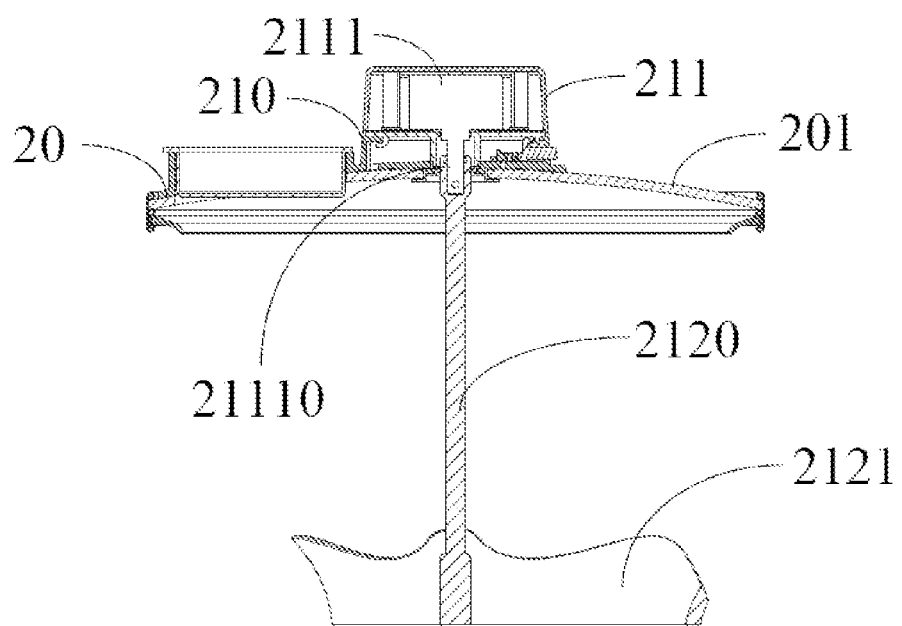
FIG. 8 is a schematic sectional view of a second embodiment of the pot lid assembly of the present application.
Figure 9:
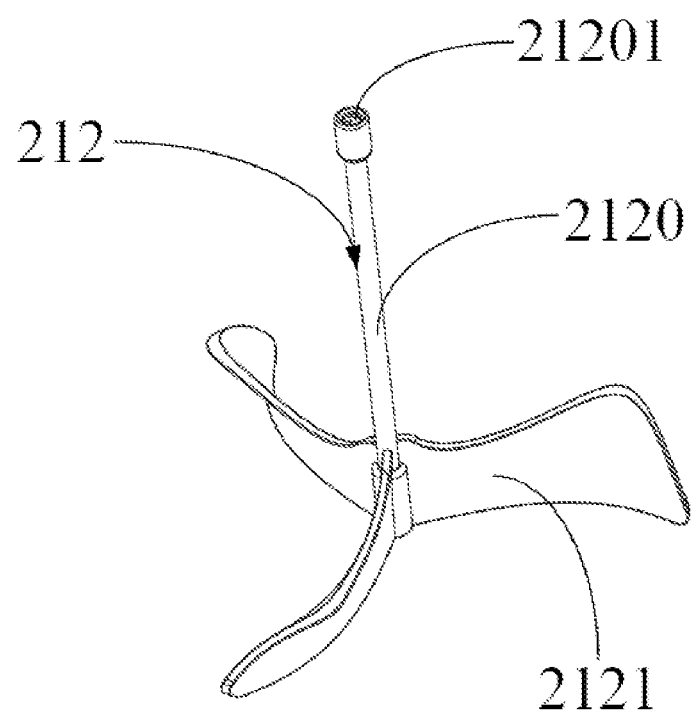
FIG. 9 is an isometric view of the mixing apparatus of the pot lid assembly shown in FIG. 8.

In a second embodiment shown in FIGS. 8 and 9, the electric motor assembly 211 and the pot lid 20 are fixed together. One among the rotary shaft 21110 of the electric motor 2111 and the stirring rod 2120 is provided with a reception slot 21201, and the end section of the other among the rotary shaft 21110 of the electric motor 2111 and the stirring rod 2120 is received in the reception slot 21201, so that the rotation of the rotary shaft 21110 causes the stirring rod 2120 to rotate. There is no fastening force present between the rotary shaft 21110 of the electric motor 2111 and the stirring rod 2120. When the pot lid 20 is removed, causing the rotary shaft 21110 of the electric motor 2111 to be disengaged from the stirring rod 2120, the mixing apparatus 212 is made to remain in the cooking space of the pot body 1. The positioning piece 210 and the top plate section 201 of the pot lid 20 are fixed together, causing the electric motor assembly 211 and the top plate section 201 of the pot lid 20 to be fixed together. The electric motor assembly 211 and the positioning piece 210 are detachable from each other, and the structure of which can be found in the electric motor assembly 211 and the positioning piece 210 of the first embodiment, which is not repeatedly described here.

The mixing apparatus 212 can stand on the bottom slab 1201 so as to prevent it from slanting or collapsing after the removal of the pot lid 20, which would affect the reassembly of the pot lid 20. Specifically, the mixing apparatus 212 includes a plurality of stirring vanes 2121. The bottoms of the plurality of stirring vanes 2121 are coplanar, so that the mixing apparatus 212 can stand in the cooking space of the pot body 1 with the stirring vanes 2121 serving as a support. Preferably, the number of stirring vanes 2121 is three.

Figure 10:
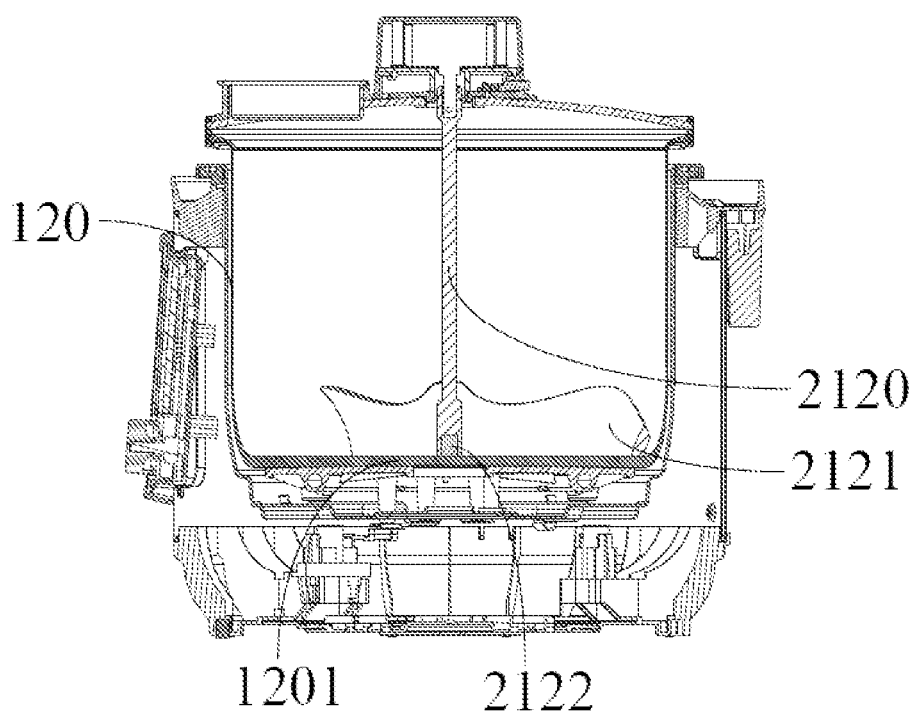
FIG. 10 is a schematic sectional view of a third embodiment of the cooking utensil of the present application.

In a third embodiment shown in FIG. 10, the stirring rod 2120 is provided with a magnet 2122 disposed at the bottom thereof. The magnet 2122 and the bottom slab 1201 of the inner pot wall 120 are magnetically attracted to each other such that the mixing apparatus 212 can stand on the bottom slab 1201 of the inner pot 120. The bottom slab 1201 is made of a material magnetically attractable by the magnet 2122, such as stainless steel. The magnet 2122 is a heat resistant magnet that prevents high temperature of the inner pot 120 from damaging it.

When the pot lid assembly 2 of the present application is in use, the mixing apparatus 212 remains in the cooking space of the pot body 1 after the removal of the pot lid 20. Compared to the problem associated with uneasy reassembly of the pot lid 20 due to the presence of food ingredients after the removal of the mixing apparatus 212 together with the pot lid 20, the pot lid assembly 2 of the present application enables convenient reassembly of the pot lid 20. Furthermore, the retention of the mixing apparatus 212 in the cooking space of the pot body 1 prevents the problem of uneven frying due to some food ingredients being pressed under the stirring rod 2120 when the mixing apparatus 212 is placed into the cooking space of the pot body 1 again, thereby ensuring desirable taste of the processed food.

The foregoing merely describes preferred embodiments of the present application, instead of limiting it in any way. While preferred embodiments of the present application have been disclosed above, they are not intended to limit the present application. Any persons skilled in the art may contemplate equivalent embodiments by making some alteration or modification to the disclosure without departing from the scope of the present application. However, any alteration, equivalent change and modification made without departing from the spirit of the present application shall fall within the scope of protection thereof.

The invention claimed is:

1. A pot lid assembly configured to cover a pot body, the pot lid assembly comprising:
   a pot lid and a mixing machine, the pot lid comprising a passageway;
   wherein the mixing machine comprises an electric motor and a mixing apparatus, the mixing apparatus having a stirring rod and a plurality of stirring vanes positioned on the stirring rod, the stirring rod and the rotary shaft being fixedly connected, and the electric motor having a rotary shaft operatively connected with the stirring rod so that the electric motor can cause the stirring rod to rotate;
   wherein a portion of the mixing machine is located in the passageway;
   wherein the pot lid is configured to cover the pot body to form a closed cooking space;
   wherein when the pot lid is removed from the pot body, the mixing apparatus remains located in the cooking space of the pot body;
   wherein when the pot lid moves upwards to be disengaged from the pot body, a portion of the mixing machine exits from the passageway, while the rotary shaft of the electric motor remains connected to the stirring rod of the mixing apparatus; and,
   wherein when the pot lid moves downwards to cover the pot body, a portion of the mixing machine passes through the passageway.

2. The pot lid assembly of claim 1, wherein the pot lid assembly comprises a sealing piece sheathed on the mixing machine to prevent air leakage from the passageway.

3. The pot lid assembly of claim 1, wherein the mixing machine comprises a positioning piece and an electric motor assembly fitted to the positioning piece, the electric motor assembly having a motor housing, the electric motor being positioned within the motor housing, and the motor housing being detachably fitted to the positioning piece.

4. The pot lid assembly of claim 3, wherein:
   the motor housing includes a first holding section;
   the positioning piece includes a positioning piece housing, a pusher, and an elastic piece fitted to the positioning piece housing;
   the pusher is provided with a second holding section;
   one end of the elastic piece is abutted against the motor housing, and the other end of the elastic piece is abutted against the pusher;
   the first holding section and the second holding section are engaged such that the electric motor assembly is positioned on the positioning piece; and,
   the first holding section and the second holding section can be disengaged by pushing the pusher.

5. The pot lid assembly of claim 4, wherein the positioning piece housing includes a pair of arms configured to be clamped to the pot body.

6. The pod lid assembly of claim 5, wherein the end of each of the arms is provided with a concaved slot into which a portion of the pot body is received.

7. The pot lid assembly of claim 1, wherein the pot lid comprises a top plate section, handles, a fastening piece positioned on the top plate section, and an abutment piece positioned on the fastening piece; the fastening piece wrapping around the edges of the top plate section, and the abutment piece being configured clamp to the pot body.

8. A frying machine comprising:
   a pot body;
   a pot lid, the pot lid comprising a passageway; and,
   a mixing machine having an electric motor and a mixing apparatus, the mixing apparatus having a stirring rod and at least one stirring vane positioned on the stirring rod, the stirring rod and the rotary shaft being fixedly connected, and the electric motor having a rotary shaft operatively connected with the stirring rod so that the electric motor can cause the stirring rod to rotate;
   wherein a portion of the mixing machine is located in the passageway;
   wherein the pot lid is configured to cover the pot body to form a closed cooking space;
   wherein when the pot lid is removed from the pot body, the mixing apparatus remains located in the cooking space of the pot body;
   wherein when the pot lid moves upwards to be disengaged from the pot body, a portion of the mixing machine exits from the passageway, while the rotary shaft of the electric motor remains connected to the stirring rod of the mixing apparatus; and,
   wherein when the pot lid moves downwards to cover the pot body, a portion of the mixing machine passes through the passageway.

9. The frying machine of claim 8, wherein the pot lid assembly comprises a sealing piece sheathed on the mixing machine to prevent air leakage from the passageway.

10. The frying machine of claim 8, wherein the mixing machine comprises a positioning piece and an electric motor assembly fitted to the positioning piece, the electric motor assembly having a motor housing, the electric motor being positioned within the motor housing, and the motor housing being detachably fitted to the positioning piece.

11. The frying machine of claim 10, wherein:
    the motor housing includes a first holding section;
    the positioning piece includes a positioning piece housing, a pusher, and an elastic piece fitted to the positioning piece housing;
    the pusher is provided with a second holding section;
    one end of the elastic piece is abutted against the motor housing, and the other end of the elastic piece is abutted against the pusher;
    the first holding section and the second holding section are engaged such that the electric motor assembly is positioned on the positioning piece; and,
    the first holding section and the second holding section can be disengaged by pushing the pusher.

12. The frying machine of claim 11, wherein the positioning piece housing includes a pair of arms configured to be clamped to the pot body.

13. The frying machine of claim 12, wherein the end of each of the arms is provided with a concaved slot into which a portion of the pot body is received.

14. The frying machine of claim 8, wherein the pot lid comprises a top plate section, handles, a fastening piece positioned on the top plate section, and an abutment piece positioned on the fastening piece; the fastening piece wrapping around the edges of the top plate section, and the abutment piece being configured clamp to the pot body.

15. A method of covering a pot body, the method comprising:
    providing a pot body;
    providing a pot lid, the pot lid comprising a passageway;
    providing a mixing machine separate from the pot lid, the mixing machine comprising an electric motor and a mixing apparatus, the mixing apparatus having a stirring rod and a at least one stirring vane positioned on the stirring rod, the electric motor comprising a rotary shaft operatively connected with the stirring rod so that the electric motor can cause the stirring rod to rotate;

passing a portion of the mixing machine through the passageway;

covering the pot body with the pot lid to form a closed cooking space; and, removing the pot lid from the pot while passing a portion of the mixing machine through the passageway, wherein when the pot lid is removed from the pot body, the mixing apparatus remains located in the cooking space of the pot body.

16. A pot lid assembly configured to cover a pot body, the pot lid assembly comprising:

a pot lid and a mixing machine;

wherein the mixing machine comprises an electric motor and a mixing apparatus, the electric motor being fixed to the pot lid, the mixing apparatus having a stirring rod and a plurality of stirring vanes positioned on the stirring rod, and the electric motor having a rotary shaft detachably connected with the stirring rod so that the electric motor can cause the stirring rod to rotate;

wherein the pot lid is configured to cover the pot body to form a closed cooking space;

wherein when the pot lid is removed from the pot body, the mixing apparatus remains located in the cooking space of the pot body, the rotary shaft of the electric motor is disengaged from the stirring rod, and the mixing apparatus remains standing in the cooking space of the pot body;

wherein the bottoms of the plurality of stirring vanes are coplanar, so that the mixing apparatus can stand in the cooking space of the pot body with the stirring vanes serving as a support;

wherein the stirring rod is provided with a magnet disposed at the bottom thereof; and, wherein the magnet and the pot body are magnetically attracted to each other so that the mixing apparatus can stand in the cooking space of the pot body.

17. A frying machine comprising:

a pot body;

a pot lid; and, a mixing machine having an electric motor and a mixing apparatus, the electric motor being fixed to the pot lid, the mixing apparatus having a stirring rod and at least one stirring vane positioned on the stirring rod, and the electric motor having a rotary shaft detachably connected with the stirring rod so that the electric motor can cause the stirring rod to rotate;

wherein the pot lid is configured to cover the pot body to form a closed cooking space; and, wherein when the pot lid is removed from the pot body, the mixing apparatus remains located in the cooking space of the pot body, the rotary shaft of the electric motor is disengaged from the stirring rod, and the mixing apparatus remains standing in the cooking space of the pot body;

wherein the bottoms of the plurality of stirring vanes are coplanar, so that the mixing apparatus can stand in the cooking space of the pot body with the stirring vanes serving as a support;

wherein the stirring rod is provided with a magnet disposed at the bottom thereof; and, wherein the magnet and the pot body are magnetically attracted to each other so that the mixing apparatus can stand in the cooking space of the pot body.

* * * * *